United States Patent Office 2,870,486
Patented Jan. 27, 1959

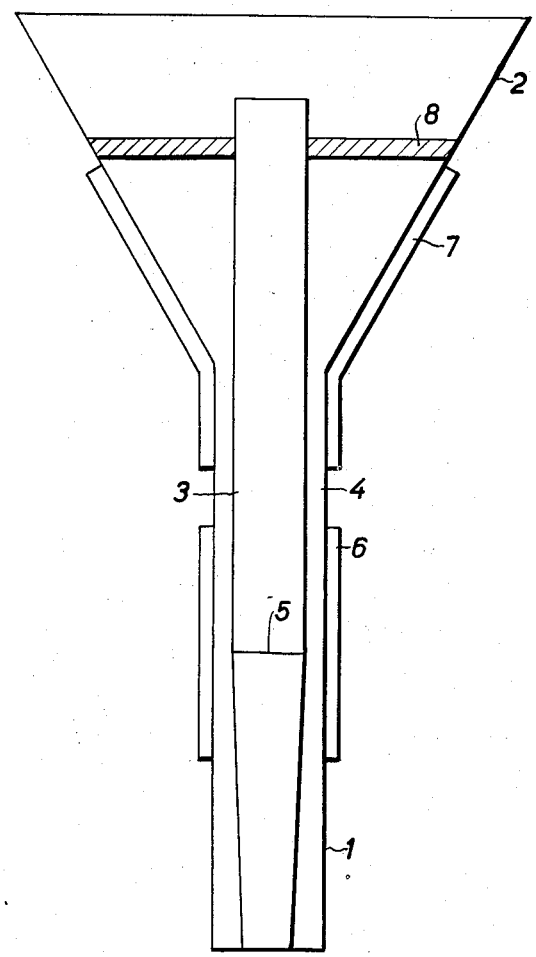

2,870,486
PROCESS FOR THE PRODUCTION OF TUBES

Herbert Wagner, Krefeld-Oppum, and Karl-Heinz Eisenmann, Koln-Stammheim, Germany, assignors to Farbenfabriken Bayer Aktiengesellschaft, Leverkusen, Germany, a corporation of Germany Application November 22, 1954, Serial No. 470,404

Claims priority, application Germany November 28, 1953

1 Claim. (Cl. 18—55)

This invention relates to a process for the production of tubes from polymerizable substances reinforced with fibres or strands of glass or other substances, using a mandrel.

Tubes have hitherto been produced by impregnating glass fibres or strands with polyesters, winding the impregnated fibres or strands on to a mandrel, and then passing the mandrel and its covering into a heated chamber, for example a drying chamber or oven, where the covering is hardened. On completion of the hardening operation, the mandrel is removed from the covering, which has assumed the form of a tube. This process allows only discontinuous production of the tubes, since the length of the tubes depends on the length of the mandrel and the polymerization must take place externally of the winding mechanism.

The present invention provides a process for the production of tubes from polymerizable substances reinforced with fibres or strands consisting of glass or of substances based on cellulose, polyamides or polyesters, wherein the said fibres or strands, impregnated with the polymerizable substance, are continuously introduced into a space formed between a mandrel and a hollow element surrounding the mandrel, are drawn preferably at constant speed over the mandrel, and are preferably then led past a heating zone and hardened. This process is continuous and is not subject to the above-mentioned disadvantages.

In order to prevent any possible creeping of the polymerization towards the filling end, the material which is to form a tube is preferably passed through a cooling zone before entering the heating zone. An example of a suitable impregnating material for the glass fibres or strands which are to be worked up to form a tube is a polymerizable mixture of a polymeric unsaturated ester with styrene in the presence of a peroxide polymerization catalyst.

An apparatus for carrying out the process of the invention, comprises a hollow element which is open at both ends, the internal space of which has fixedly arranged therein a preferably coaxial mandrel the diameter of which is smaller than the internal bore of the hollow element, and a heating means arranged on the outside of the hollow element. A cooling means can also be provided before the heating means in the direction of travel of the material forming the tube.

The mandrel is preferably tapered at its end remote from the point of entry of the impregnated fibres or strands. The heating means can then be arranged at the point at which the mandrel begins to taper; preferably the heating zone extends to each side of the point.

One embodiment of the apparatus for carrying out the process of the present invention is shown diagrammatically in the accompanying drawing.

In the drawing, a vertical hollow element 1 which is open at both ends has a charging funnel 2 for accommodating an impregnating mass. A mandrel 3, which is preferably chromium-plated and highly polished, is fixed coaxially inside the hollow element 1 by means of supporting fins 8 so that an annular space 4 is formed between the said mandrel and the inside wall of the hollow element 1. The end of the mandrel 3 remote from the charging funnel 2 is, beginning at a point 5, made tapered by an amount corresponding to the contraction of the extruded resin on hardening. Fixed on the outside of the hollow element 1 is a heating means 6. The heating zone starts above the point 5 and extends to below the point 5. Provided above the heating zone is a cooling zone 7; this cooling zone prevents creeping of the polymerization towards the charging funnel.

Glass strands or fibres are continuously introduced through the funnel 2 filled with the impregnating mass, and the resulting impregnated fibres or stands pass into the annular space 4, and begin to harden to form a tube as they pass through the heating zone 6.

The tube so formed is withdrawn from the mandrel 3 continuously at constant speed by means of a withdrawal device (not shown). The speed at which the material travels through the apparatus, and the polymerization temperature, are dependent on one another. The glass strands to be introduced into the funnel 2 can be arranged parallel to one another; alternatively they can be introduced in a spiral form if the mandrel is fixed in a suitable manner. If a braiding machine is connected ahead of the apparatus, it is possible to use glass strands in braided form. Instead of fibres or strands consisting of glass, it is also possible to use fibres or strands based on cellulose, polyamides or polyesters, depending on the purpose for which the tubes are intended.

The tubes can alternatively be manufactured in a horizontal position by a slight modification of the apparatus. The continuous working obtained by using the process of the present invention renders it possible for manufacturing costs to be appreciably reduced. Tubes can be cut to the required length from the moving material and be finally hardened.

We claim:

Process for the extrusion of a continuous polymeric tube reinforced with fibers comprising introducing a continuous stream of polymerizable solution having fibers dispersed therein into one end of an elongated annulus formed by the positioning of a mandrel coaxially within a cylinder, said mandrel tapering to a smaller diameter at the discharge end of the annulus so as to enlarge this zone of the annulus accordingly, heating the polymerizable solution in this zone, whereby it polymerizes and hardens, thus fixing the position of the reinforcing fibers embedded therein, extruding said solution through the annulus at a speed which is proportional to the temperature of polymerization, and continuously withdrawing a polymeric fiber-reinforced tube from the discharge end of the annulus.

References Cited in the file of this patent

UNITED STATES PATENTS

| | | |
|---|---|---|
| 1,261,317 | Tew | Apr. 2, 1918 |
| 1,455,946 | Wester | May 22, 1923 |
| 1,650,687 | Bond | Nov. 29, 1927 |
| 2,450,457 | Grotenhuis | Oct. 5, 1948 |
| 2,456,650 | Ryan | Dec. 21, 1948 |
| 2,683,900 | Lotz | July 20, 1954 |